US 8,785,805 B2

(12) United States Patent
Simon

(10) Patent No.: US 8,785,805 B2
(45) Date of Patent: Jul. 22, 2014

(54) METHOD OF MAKING A COVERING FOR A CONTAINMENT POOL, TANK OR ENCLOSURE

(75) Inventor: Jean Simon, Champ sur Drac (FR)

(73) Assignee: Societat d'Obres I Treballs Subterranis del Pirineu, S.L. (Sots, S.L.), Xalet Borda Blanca (AD)

(*) Notice: Subject to any disclaimer, the term of this patent is extended or adjusted under 35 U.S.C. 154(b) by 733 days.

(21) Appl. No.: 12/450,958

(22) PCT Filed: Apr. 30, 2008

(86) PCT No.: PCT/FR2008/000616
§ 371 (c)(1),
(2), (4) Date: Oct. 20, 2009

(87) PCT Pub. No.: WO2008/152220
PCT Pub. Date: Dec. 18, 2008

(65) Prior Publication Data
US 2010/0122449 A1    May 20, 2010

(30) Foreign Application Priority Data

May 4, 2007    (FR) ..................................... 07 03231
Jun. 8, 2007    (FR) ..................................... 07 04118
Oct. 24, 2007    (FR) ..................................... 07 07471

(51) Int. Cl.
*B23K 31/02*    (2006.01)
(52) U.S. Cl.
USPC ............... 219/61; 219/57; 219/58; 219/59.1; 376/203

(58) Field of Classification Search
None
See application file for complete search history.

(56) References Cited

U.S. PATENT DOCUMENTS

| 4,764,336 A | * | 8/1988 | Aubert et al. ................. 376/272 |
| 5,132,078 A | * | 7/1992 | Cai ................................ 376/462 |
| 5,388,129 A | * | 2/1995 | Hartley ......................... 376/249 |
| 6,713,710 B1 | | 3/2004 | Zhang |

FOREIGN PATENT DOCUMENTS

| EP | 0 010 053 A1 | 4/1980 |
| EP | 0 191 672 A1 | 8/1986 |
| JP | A-59-30475 | 2/1984 |
| JP | A-60-119825 | 6/1985 |
| JP | A-62-62290 | 3/1987 |
| JP | A-6-82596 | 3/1994 |

* cited by examiner

Primary Examiner — Johannes P Mondt
(74) Attorney, Agent, or Firm — Oliff PLC

(57) ABSTRACT

A covering for a containment pool, tank or enclosure, in particular a containment enclosure for a nuclear power plant, is produced by placing metal sheets parallel to a first wall at a predetermined distance from the latter, each sheet comprising anchoring elements, on a first face arranged facing the first wall, placing a rail situated between the anchoring elements and comprising side walls and a base delineating a space facing the area to be welded with two adjacent sheets, making a weld bead by full-penetration butt welding of the adjacent metal sheets, and pouring concrete between said first wall and the metal sheets, the anchoring elements of the metal sheets being completely independent from the weld bead after the concrete has been poured.

13 Claims, 20 Drawing Sheets

METHOD OF MAKING A COVERING FOR A CONTAINMENT POOL, TANK OR ENCLOSURE

BACKGROUND OF THE INVENTION

The invention relates to a method for making a covering for a containment pool, tank or enclosure, in particular a containment enclosure for a nuclear power plant, comprising at least assembly of a series of adjacent sheets and welding of the sheets to one another to form a part of a surface of the covering by making a weld bead.

STATE OF THE ART

The covering of a containment pool, tank or enclosure is formed by an inner metal covering added on to a concrete construction so as to confine the effluents and guarantee leaktightness of the pool under normal or accident operating conditions. The metal covering is formed by sheets welded to one another.

Welding is usually performed by means of a welding technique using a jig placed behind the sheets at the level of the area to be welded. For example, in FIG. 1, two adjacent metal sheets 1 and 2 have been welded by the jig welding technique. Sheets 1 and 2 are thus fixed onto a concrete wall 3. An anchoring element 4 sunk in the concrete is securely attached to a jig 5 arranged in the concrete and pressing against sheets 1 and 2 at the level of the welding area 6.

Such a technique is not however implemented, as tightness cannot be 100% guaranteed. The weld made on the jig is in fact difficult to check and can therefore not be guaranteed. In addition, it may present remanent defects 7 due to inclusions, oxidations created during welding and causing incipient cracks. These incipient cracks can however affect the mechanical strength of the covering subjected to stresses such as pressure and temperature variations or vibrations due for example to an earthquake. With this jig welding technique, the tightness of the covering does in fact depend on the welding area 6 which is in contact with anchoring element 4 via jig 5. A tightness defect then jeopardizes the mechanical strength of the anchoring and therefore of the covering.

To overcome this problem and as represented schematically in FIG. 2, it has been proposed to provide a channel 8 to recover drips in the event of leakage between the concrete wall 3 and sheets 1 and 2. A concrete 10, called second phase concrete, is then poured between wall 3 and sheets 1 and 2, and contains a first enclosure 9 fixed to concrete wall 3. This first enclosure 9 comprises a bottom wall 9a forming an integral part of concrete wall 3 (first phase concrete) and side walls 9b coming into contact with sheets 1 and 2. In FIG. 2, first enclosure 9 presents a U-shaped cross-section. A second enclosure 11 presenting smaller dimensions than those of the first enclosure is arranged in first enclosure 9. It comprises a top wall 11a coming into contact with sheets 1 and 2 at the level of welding area 6. Top wall 11a is extended by side walls 11b resting on and securedly attached to bottom wall 9a of first enclosure 9. In FIG. 2, second enclosure 11 presents a cross-section in the form of a reverse U. The space arranged between side walls 9b and 11b thus forms channel 8 designed to recover drips in the event of leakage at the level of the welding area. Top wall 11a corresponds to jig 5 represented in FIG. 1. For example purposes, Patent Application EP-A-0191672 describes such an embodiment.

However, even with a drip recovery channel, the risk of loss of leaktightness remains for leakages by capillarity may occur up to the second phase concrete 10, as indicated by arrows F in FIG. 2. In addition, this system does not guarantee a good interpretation of the welding between two sheets, nor does it guarantee prevention of risks of welding fractures (brittle fracture or fatigue fracture).

OBJECT OF THE INVENTION

The object of the invention is to provide a method for making a covering for a containment pool, tank or enclosure remedying the drawbacks of the prior art. More particularly, the object of the invention is to provide a method whereby the tightness of the welds made and the strength of the covering can be guaranteed.

According to the invention, this object is achieved by the appended claims.

In particular, this object is achieved by the fact that assembly of a series of adjacent sheets comprises:
placing the sheets parallel to a first wall at a predetermined distance from the latter, each sheet comprising anchoring elements, on a first face arranged facing the first wall,
and placing a rail situated between the anchoring elements and comprising side walls and a back base delineating, with two adjacent sheets, a space facing the area to be welded,
and by the fact that welding of the adjacent sheets is a full-penetration butt welding and by the fact that it is followed by pouring concrete between said first wall and the sheets, the anchoring elements of the sheets being completely independent from the weld bead after the concrete has been poured.

A method according to the invention enables a junction to be made between adjacent sheets by full-penetration butt welding, meeting the following criteria:
100% over the whole length of the weld bead or beads (or joint) when visual inspection testing is performed,
100% over the whole length of the weld bead or beads when penetrant inspection is performed,
100% over the whole length of the weld bead or beads when X-ray inspection testing is performed,
100% over the whole length of the weld bead or beads when visual inspection testing is performed using a "vacuum box".

The above set of tests thereby enables the quality of the joint to be guaranteed in equivalence with the sheets. These tests thereby guarantee that the weld bead or beads have the mechanical characteristics of the sheets. The joint is thereby in conformity with the design codes used in widespread manner in the technical field of manufacturing containments for nuclear power plants, which guarantees the perenniality of the covering (thermal cycling, earthquake, etc.).

Finally, the fact that, after the concrete has been poured, the anchoring elements of the sheets are completely independent from the weld bead presents the advantage of dissociating the strength function from the tightness function, unlike the prior art.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

The covering of a containment pool, a tank or enclosure is produced by successively placing adjacent sheets side by side and welding said sheets so as to cover the whole of the concrete walls of said pool.

The strength function of the covering is in particular dissociated from the tightness function at the level of the welds, as the elements providing the strength of the covering are not in contact with the welding areas or weld beads. More particularly, each sheet comprises anchoring elements on its face facing the concrete wall, which elements ensure the strength of the covering. These anchoring elements are completely independent from the weld once the concrete has been poured. They are therefore not adjoined to the welding areas.

Furthermore, the adjacent sheets are welded by full-penetration butt welding or weld bead. What is meant by full-penetration butt welding is making a weld bead joining the edges of two adjacent sheets, the two edges in general being separated from one another by a predetermined gap that the weld bead completely fills. Furthermore, full-penetration butt welding does not require the use of a jig or a bearing surface as in the prior art. This enables a weld bead to be obtained without any junction defects and that does not present any risk of rupture due to the flexural stresses caused by a jig or a bearing surface.

Finally, a rail is placed facing the area to be welded. Such a rail at least enables inspections of the covering joints to be performed, in particular X-ray inspection.

A first particular embodiment of such a covering is more particularly illustrated in FIGS. 3 to 6.

Figure 1:
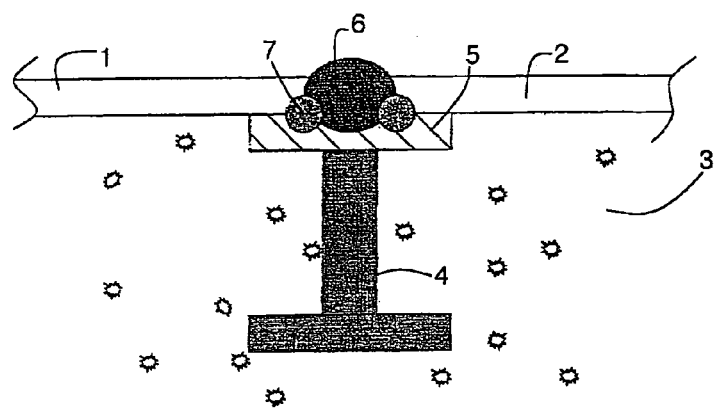
FIGS. 1 and 2 schematically represent, in cross-section, two embodiments of a weld between two sheets according to the prior art.
Figure 2:
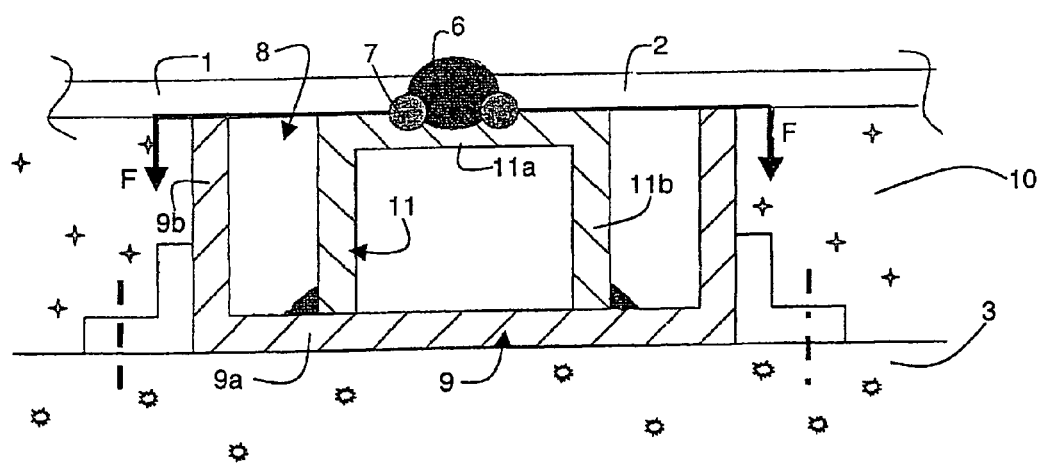
Figure 3:
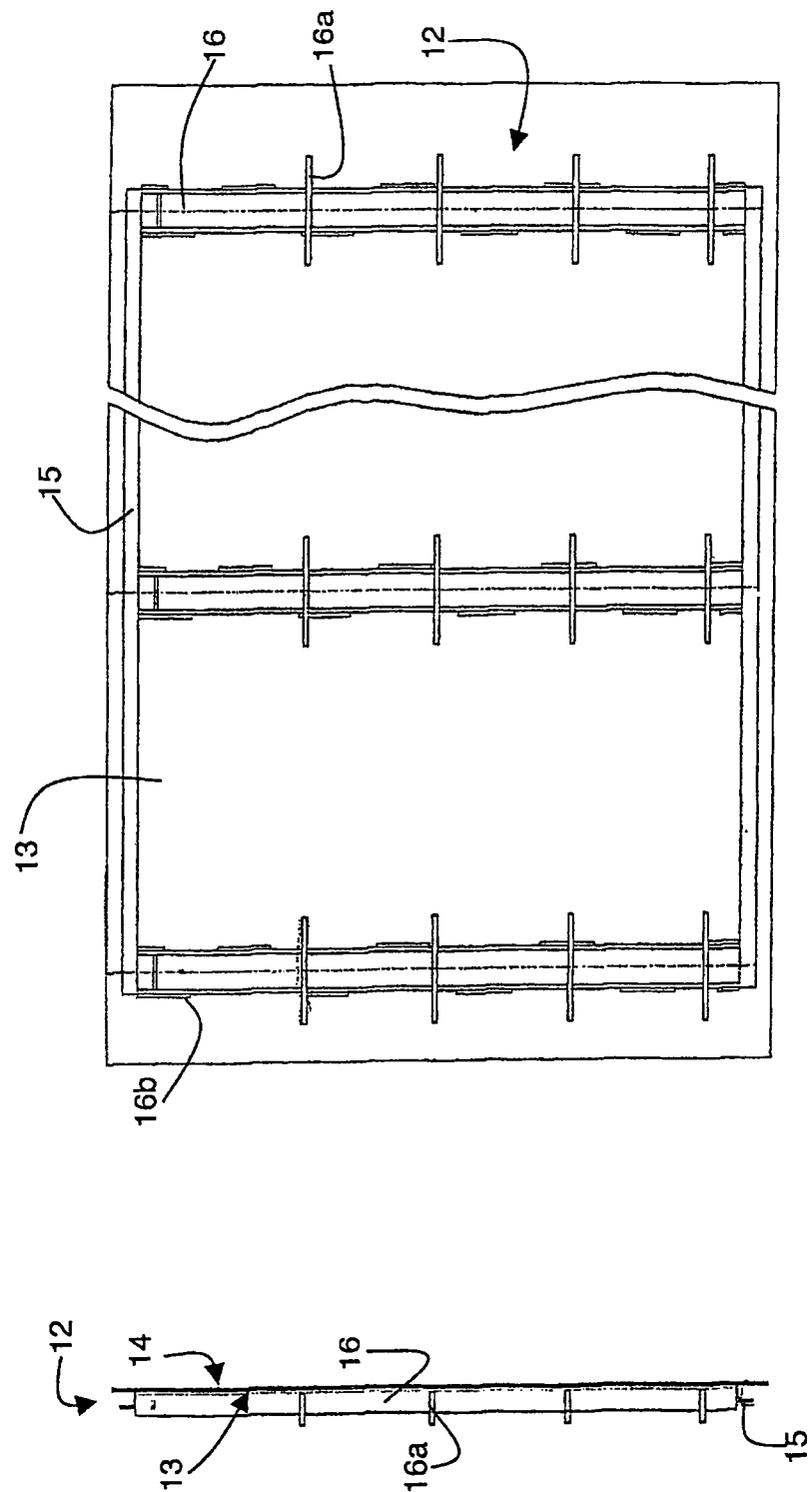
FIG. 3 represents, in front view and side view, a sheet used in a method according to the invention.

As represented in FIG. 3, each metal sheet 12 of the covering is provided with two opposite faces:
a first face 13 designed to be arranged facing the concrete wall to be covered,
and a second face 14 corresponding to the face via which welding is performed.

The two opposite faces 13 and 14 are joined via the edges. Depending on the type of welding (horizontal vertical or vertical-up), the edges of sheets 12 can have different shapes. The edges of a sheet 12 generally comprise two parts: a first part in contact with first face 13 and a second part in contact with second face 14. The first part advantageously forms a right angle with first face 13 whereas the second part is a bevelled part. However, for a vertical-up weld, the bevelled part of a sheet preferably forms an angle of 60° with the bevelled part of an adjacent sheet. For example, an edge of a sheet with a thickness of 6 mm can comprise a bevelled part over a thickness of 4 mm with an incline of about 30° with respect to the first part of said edge. Furthermore, for a vertical-up weld, the inclines of the bevelled parts of two adjacent sheets with respect to the rest of their edge are advantageously identical. This is not the case for sheets designed to be horizontal vertical welded. Indeed, for horizontal vertical welding, the second parts (bevelled parts) of two adjacent sheets respectively form an angle of 15° and an angle of 45° with the second parts of the associated edges.

Furthermore, in this first embodiment, first face 13 of each sheet 12 comprises L-shaped angles 15 over its whole periphery. Angles 15 are in fact formed by substantially perpendicular first and second wings. In addition, the first wing of an angle 15 is fixed to first face 13 of sheet 12 so as to be substantially perpendicular to said first face and close to an edge of sheet 12. More particularly, as represented in the side view of FIG. 3, the position of angle 15 and the length of the second wing (wing parallel to first face 13) are determined such that said second wing does not extend beyond first face 13.

In this embodiment, first face 13 of each sheet also comprises anchoring elements 16 in particular ensuring the mechanical strength of the covering. For example, in the side view of FIG. 3, three anchoring elements 16 formed by sections having a U-shaped cross-section are welded to first face 13 of the sheet. The three anchoring elements 16 are arranged parallel to one another in the widthwise direction of sheet 12. Notches are made in the side walls of anchoring elements 16, i.e. in the wings of each U, to place and point thin leaves or flats 16a. The welds 16b made to secure anchoring elements 16 onto first face 13 of each sheet 12 can be checked by penetrant inspection in the workshop. In FIG. 3, welds 16a are discontinuous. They could however be continuous.

In the first embodiment, a series of sheets 12 is then assembled and fixed onto a concrete wall 3 to form part of a wall of the covering. Sheets 12 are arranged successively side by side with a predetermined pitch between two sheets 12. The pitch is for example 2 mm. The sheets are then fixed parallel to concrete wall 3 at a predetermined distance.

Figure 4:
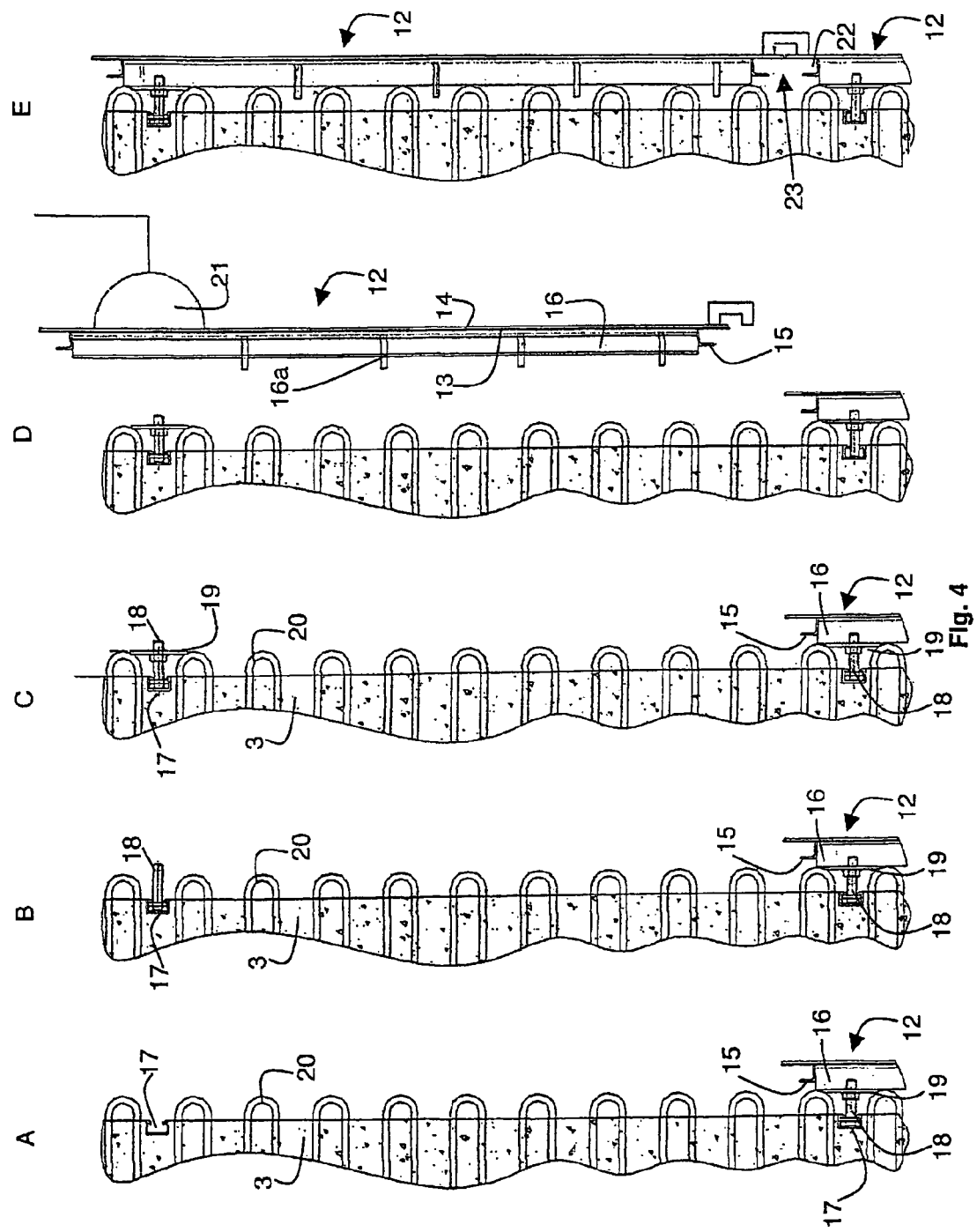
FIG. 4 schematically represents, in cross-section, the different steps whereby a series of sheets can be fixed to a concrete wall.

FIG. 4, with its five cross-sectional views A to E, illustrates a particular embodiment of fixing of a series of adjacent sheets 12 onto a concrete wall 3. A sheet 12 is fixed to concrete wall 3, by means of certain anchoring elements 16. In views A to E, anchoring elements 16 of two sheets 12 are in fact successively fixed to HALFEN rails 17 sunk in concrete wall 3. Fixing is performed by means of threaded rods 18 each fixed via one end to HALFEN rail 17 and via the other end to a support sheet 19 welded to an anchoring element 16. Sheets 12 then rest on projecting reinforcements 20 salient from concrete wall 3.

Each sheet 12 is for example moved by means of a vacuum spreader 21 until certain anchoring elements 16 are each pressing against support sheets 19 fixed beforehand to HALFEN rails 17. Once sheet 12 has been placed pressing against support sheets 19, its position is adjusted vertically and horizontally with respect to the adjacent sheets 12. This adjustment for example enables the predetermined pitch between two adjacent sheets to be obtained. Then anchoring elements 16 placed pressing against support sheets 19 are welded to said support sheets 19. The welds thus made can then be checked on site, for example by penetrant inspection.

When sheets 12 of a series are fixed to concrete wall 3 and as represented in view E of FIG. 4, each angle 15 of a sheet 12 forms a rail 22 advantageously provided with a longitudinal central groove 23 with the associated angle 15 of an adjacent sheet 12, facing the area to be welded. Rail 22 thus comprises side walls and a back base formed by the first and second wings of angle 15 of the two adjacent sheets and delineating a free space facing the area to be welded with the first faces of the two adjacent sheets.

Figure 5:
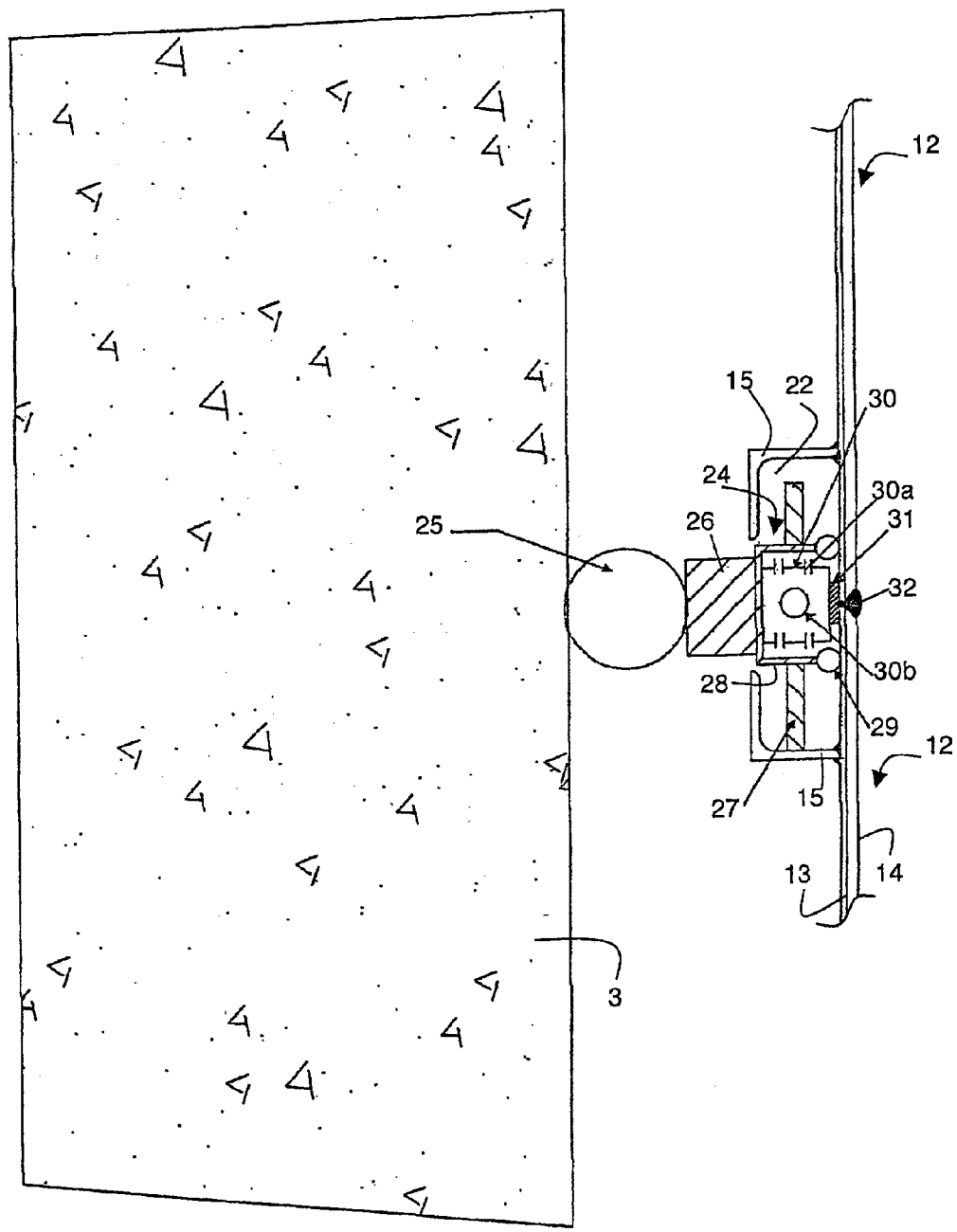
FIG. 5 schematically represents, in cross-section, making a weld between two adjacent sheets.

The space delineated by such a rail 22 and by the first faces of the two sheets is more particularly designed to receive a movable saddle when welding is performed. What is meant by movable saddle is a mechanical assembly able to move in controlled manner in rail 22. Thus, as represented in FIG. 5, a movable saddle 24 is placed in rail 22. It is held in rail 22 against first faces 13 of sheets 12 by means of a support element pressing between concrete wall 3 and saddle 24. The support element is for example formed by a pneumatic jack 25 pressing against concrete wall 3. A heat-protective element 26 can further be arranged between said jack 25 and saddle 24.

Saddle 24 is designed to form an inert gas zone or atmosphere at the level of the area to be welded, on the side where first faces 13 of sheets 12 are situated. Saddle 24 being movable, its movement follows the movement of the welding apparatus so as to always form the inert gas zone at the place and time welding is performed.

Saddle 24 therefore comprises a neutral gas diffusion volume coming into contact with the two adjacent sheets 12. The neutral gas diffusion volume is held in rail 22 by a support sheet 27 enabling the altitude of the diffusion volume and the sliding in rail 22 to be adjusted. The diffusion volume is more particularly formed by a gutter 28 kept pressing on the two sheets 12 by the pneumatic jack 25. A seal 29 is advantageously fitted between sheets 12 and said gutter to tightly seal the latter. Furthermore, an inert gas diffuser 30 comprising a neutral gas injection tube 30a and outlet holes 30b is arranged, possibly with stainless steel wool (not represented in FIG. 5), in the space arranged by gutter 28.

Furthermore, in FIG. 5, a ceramic plate 31 is arranged in gutter 28 between diffuser 30 and first faces 13 of sheets 12. Said ceramic plate 31 advantageously comprises a surface provided with a groove pressing against first faces 13 (not represented in FIG. 5). Said groove is arranged facing the area to be welded and is designed to locate the inert gas precisely at the level of the area to be welded. Weld bead 32 is then made on the side where second faces 14 are located by means of a welding apparatus such as a MIG or TIG welding apparatus. Local penetration welding could also be performed. In this case, ceramic plate 31 is not necessary. Finally, any type of welding method can be used provided it enables full-penetration butt welding to be achieved. For example, the welding method can also be plasma welding, laser welding or electron beam welding.

Once weld bead 32 has been made, saddle is removed from rail 22 and weld bead 32 is inspected. In conventional manner, the weld is checked by means of the following tests:
 a penetrant inspection test,
 an X-ray inspection test,
 and at least one visual inspection test with in particular a visual inspection test performed by means of a box enabling a vacuum to be made at the level of the welded area, also called "vacuum box".

Figure 6:
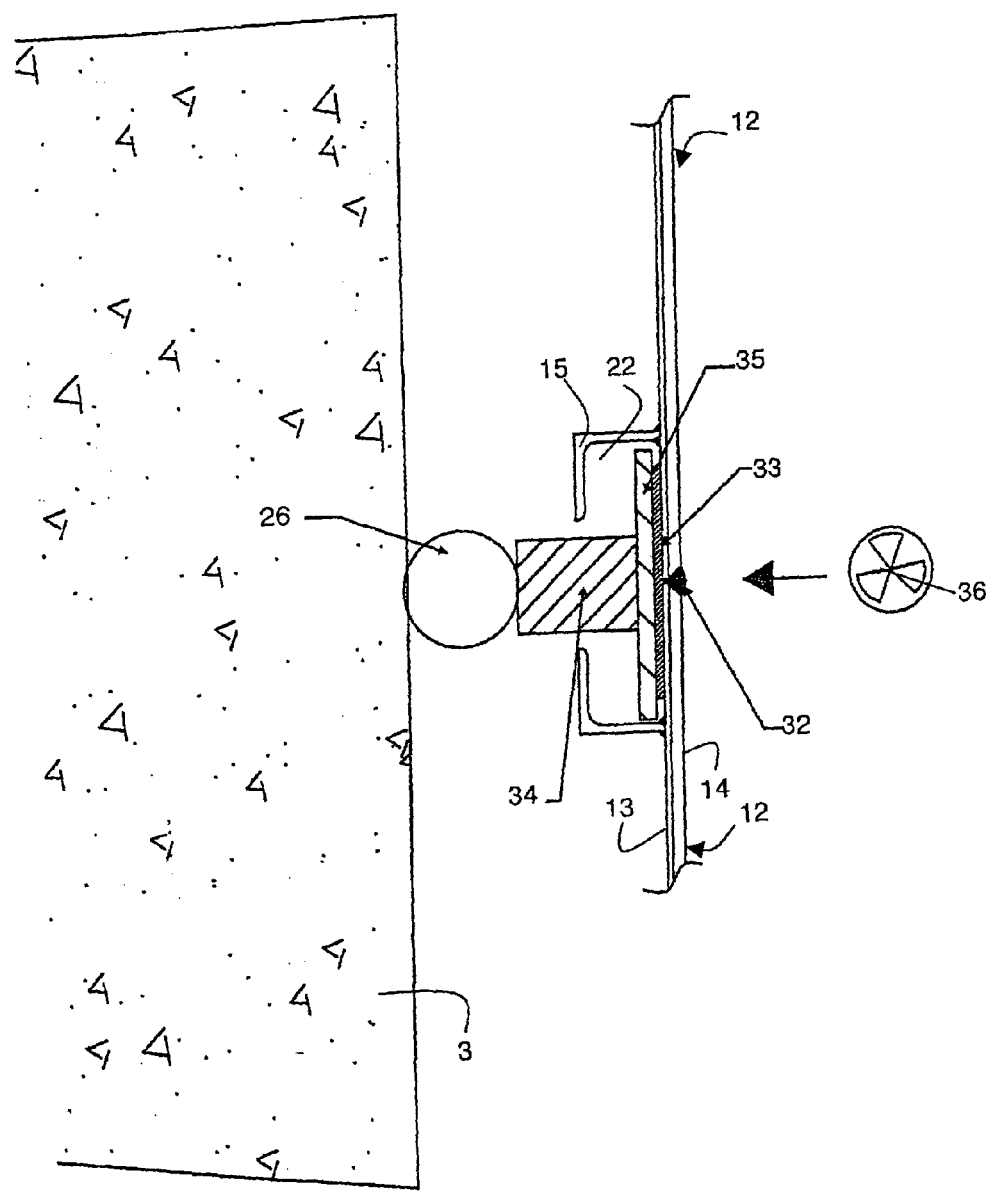
FIG. 6 schematically represents, in cross-section, performing X-ray inspection after two adjacent sheets have been welded.

More particularly, the X-ray inspection test is, as represented in FIG. 6, performed by placing a radiographic film 33 against first faces 13 of sheets 12. Film 33 is arranged in rail 22, at the level of the welded area (or weld bead 32) to be checked. The film is held against first faces 13 by pneumatic jack 26 and a wedge 34. Pneumatic jack 26 presses between wall 3 and said wedge 34. Furthermore, film 33 can be arranged on a support plate 35 arranged in rail 22. X-rays 36 are then applied at the level of weld bead 32 so as to transpose the weld onto radiographic film 33 and determine whether the latter presents any defects.

If one of the inspection checks made is negative, the welding and inspection steps can be repeated in order to obtain a weld with a welding coefficient close to 1.

Once all the sheets of a series have been welded to one another and welded to the other previously assembled and welded sheets, concrete, also called second phase concrete, is poured between concrete wall 3 and said welded sheets 12 so as to fill the space existing between said wall 3 and sheets 12. Anchoring elements 16 and angles 15 are then sunk in said concrete, then providing the strength of the part of the wall of the covering achieved. Furthermore, unlike in the prior art, once the welds have been made and inspected, said anchoring elements 16 and angles 15 are not in direct contact with weld beads 32. This enables the tightness function performed by weld beads 32 and the strength function performed by anchoring elements 16 and angles 15 to be dissociated.

A production method according to the invention then enables a good-quality weld, and more particularly good mechanical characteristics of the metal sheets, to be obtained. This presents the advantage of not having to take particular characteristics of the welds into account in the strength calculations.

The welded sheets further act as formwork to pour the second phase concrete between concrete wall 3 and said sheets 12. This also enables the contact between sheets 12 and said concrete to be improved. Furthermore, the anchoring elements can be made from ferritic steel as they are sunk in the second phase concrete.

Finally, the welding operation being performed in an inert gas atmosphere enables very good quality welds to be obtained in compliance with the requirements of the safety code in force in the field of nuclear power plants. The inspection operations of the welds can moreover be performed while the covering is being produced. Leaktightness of the covering can then be guaranteed.

The second embodiment of FIGS. 7 to 13 represents the different phases of making a covering with butt-welded sheets and with a drip recovery gutter. The method used is similar to that of FIGS. 3 to 6, but L-shaped angles 15 of sheets 12 are replaced by a drip recovery gutter 40 facing weld bead 32. The same reference numbers will be used in the following to denote identical parts to those of FIGS. 3 to 6.

Figure 7:
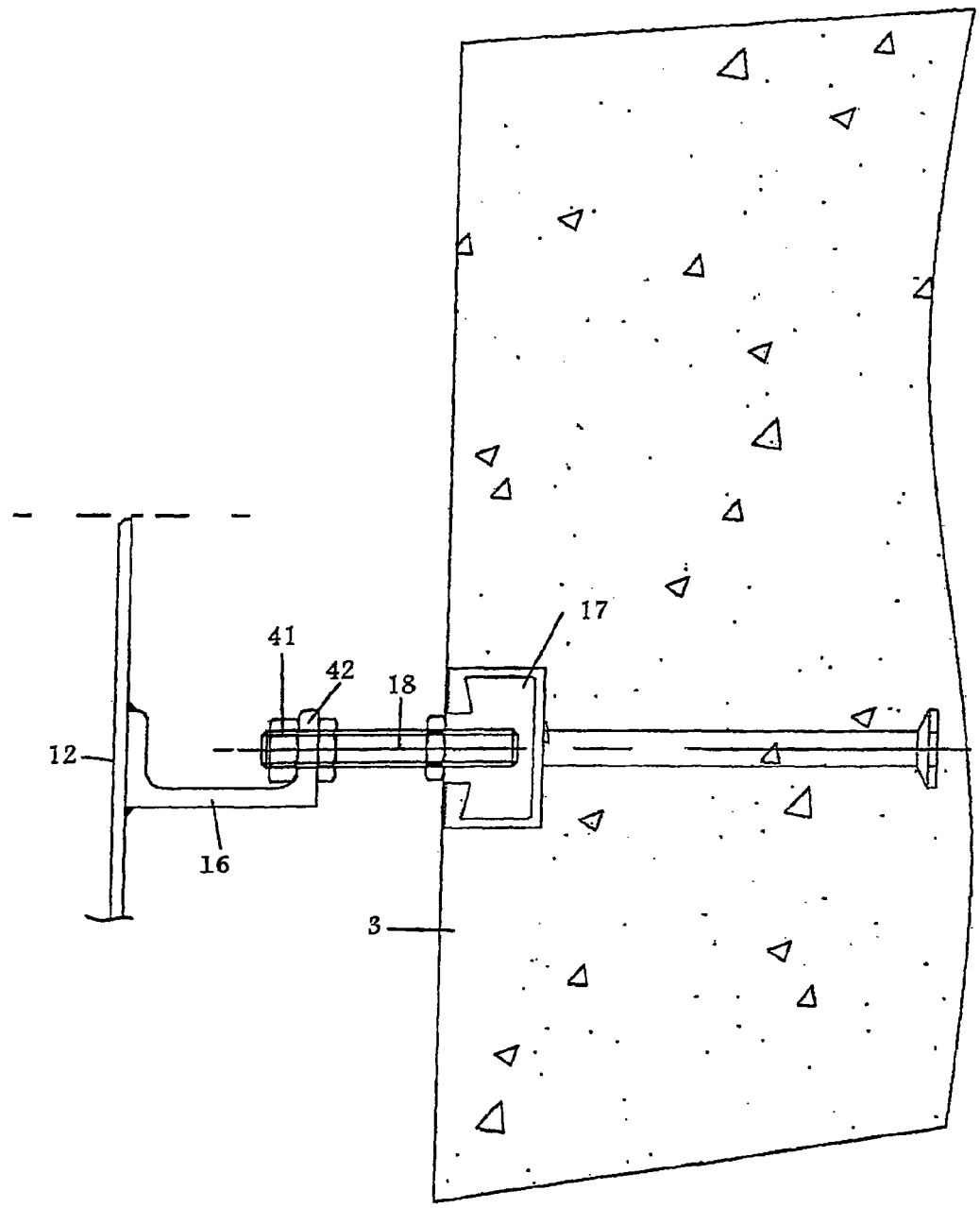
FIGS. 7 to 13 illustrate the different phases of producing a system for anchoring a covering to butt-welded sheets with a drip recovery gutter.

In FIG. 7, U-shaped anchoring element 16 of a first metal sheet 12 is fixed to threaded rod 18 by means of an adjustment nut 41 and a locknut 42. The opposite end of rod 18 is secured in an anchoring 17 of Halfen rail type sunk in first phase concrete 3. Adjustment nut 41 enables the distance between the top face of concrete 3 and sheet 12 to be adjusted.

Figure 8:
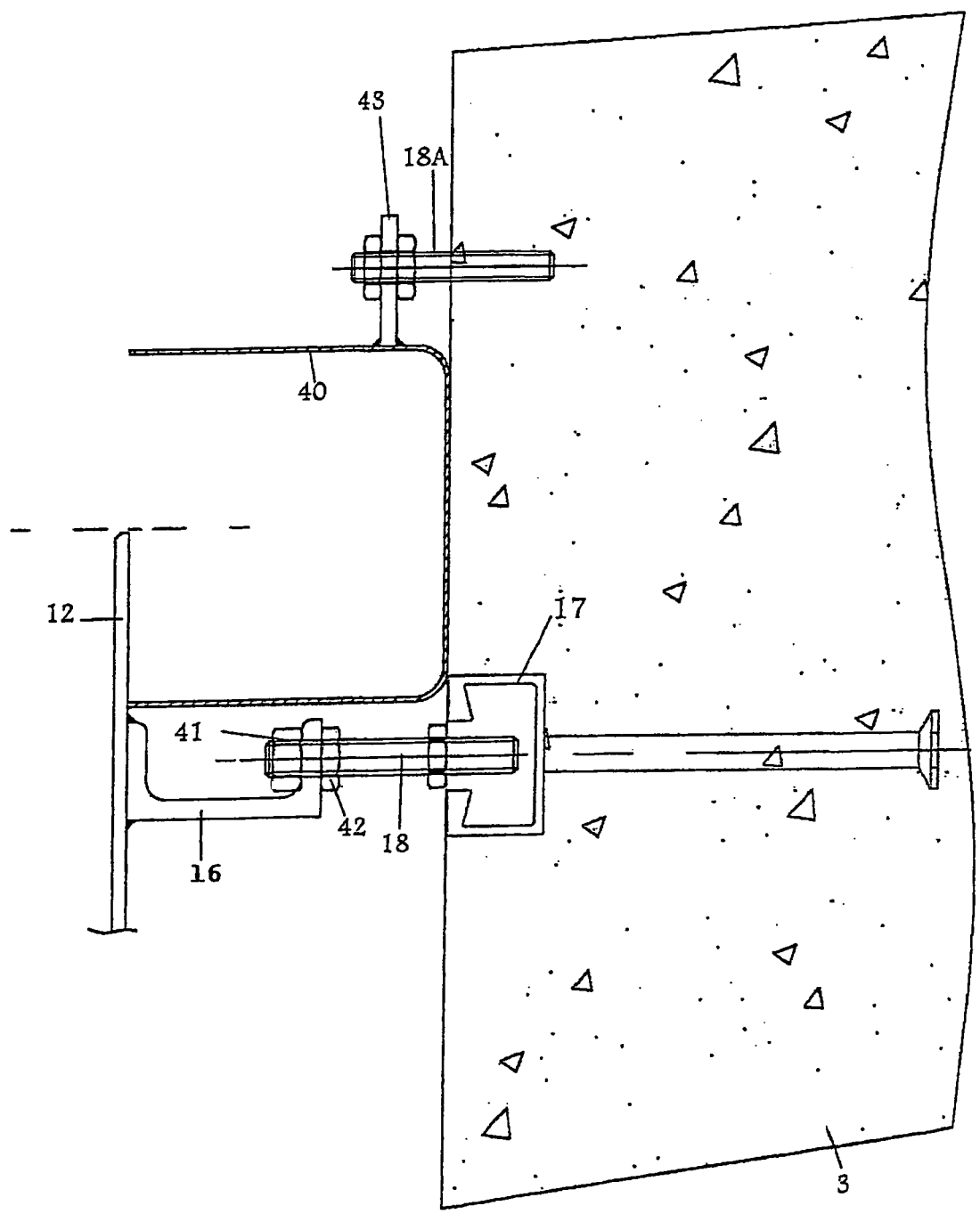

FIG. 8 shows fitting of a drip recovery gutter 40. Gutter 40 presents a U shape pressing on concrete 3, one of the parallel branches of the U extending perpendicularly to sheet 12 laid back from anchoring element 16. The parallel branches of gutter 40 and the bottom of said gutter 40, with the first faces of the adjacent sheets, thereby delineate a space facing the area to be welded.

Gutter 40 is kept in place by means of a fixing lug 43 fitted in adjustable manner on a threaded rod 18A anchored in concrete 3. The means for fixing gutter 40 onto concrete wall 3 are therefore completely independent from anchoring elements 16. Gutter 40 forms a rail, like the one delineated in the first embodiment by the L-shaped angles.

Figure 9:
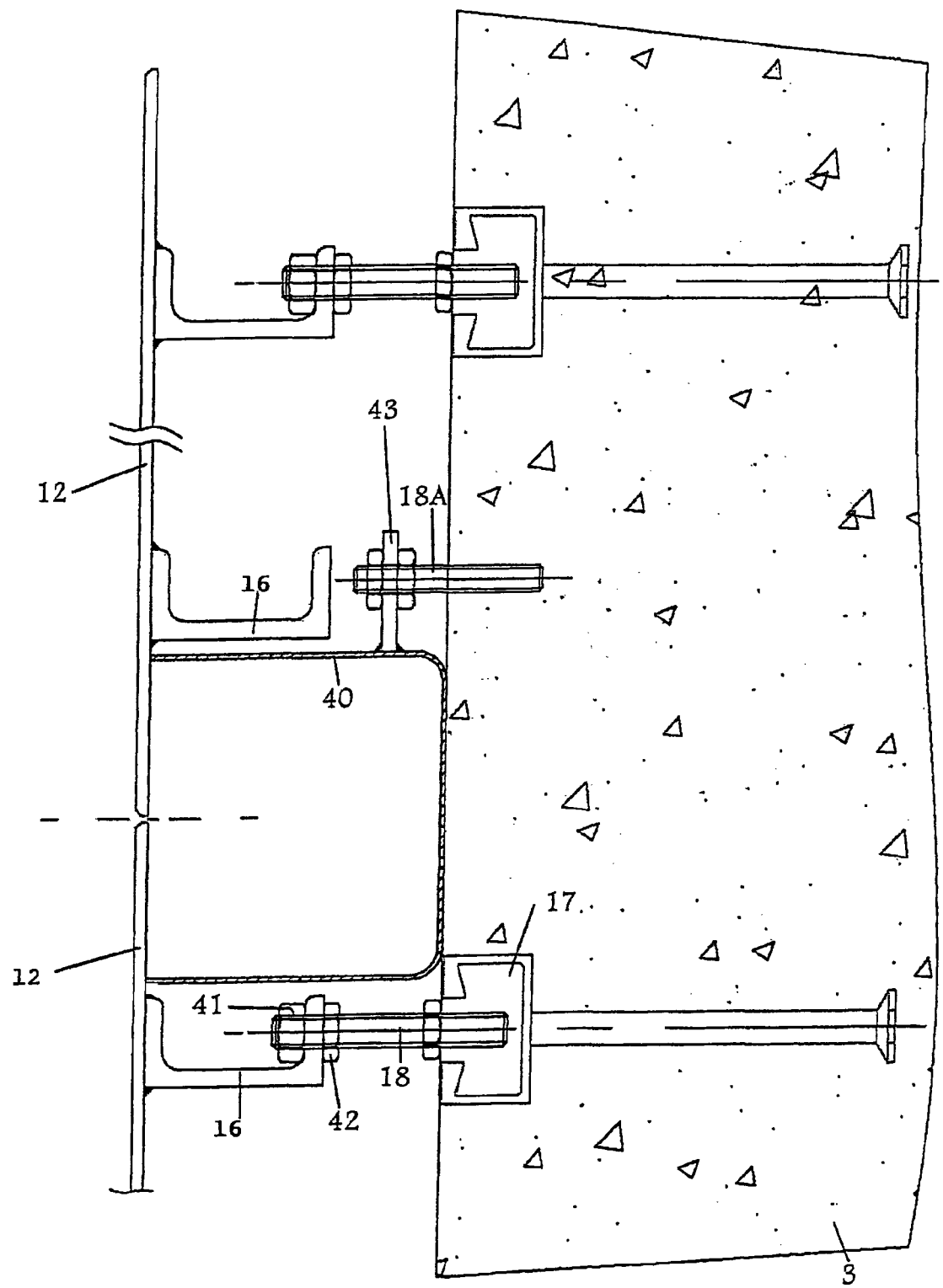
Figure 10:
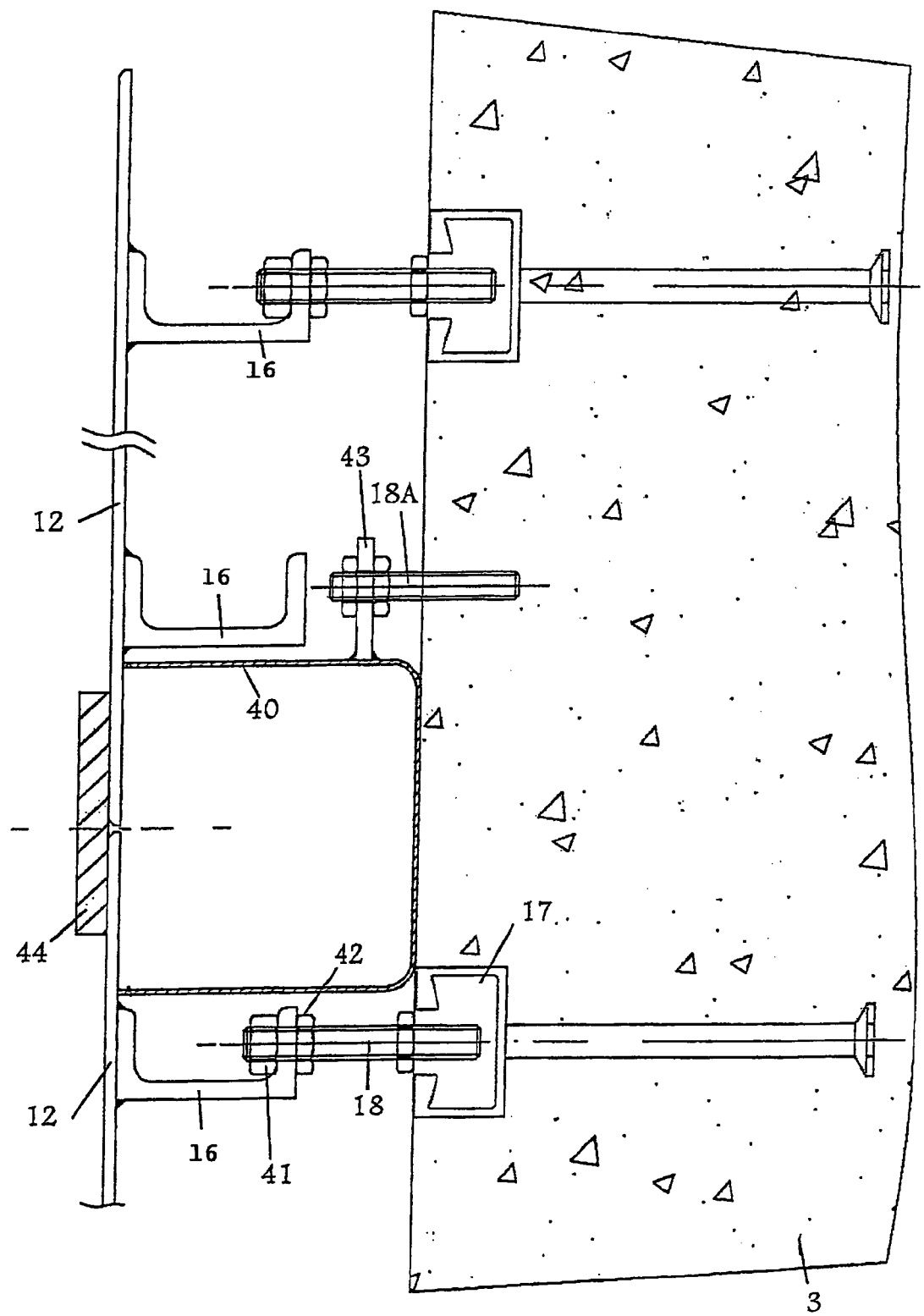

In FIGS. 9 and 10, a second sheet 12 is positioned end-to-end in the same plane with first sheet 12, followed by fitting of a line-up clamp 44 opposite gutter 40. The area of the two sheets 12 to be welded is at equal distance from the parallel branches of gutter 40.

Figure 11:
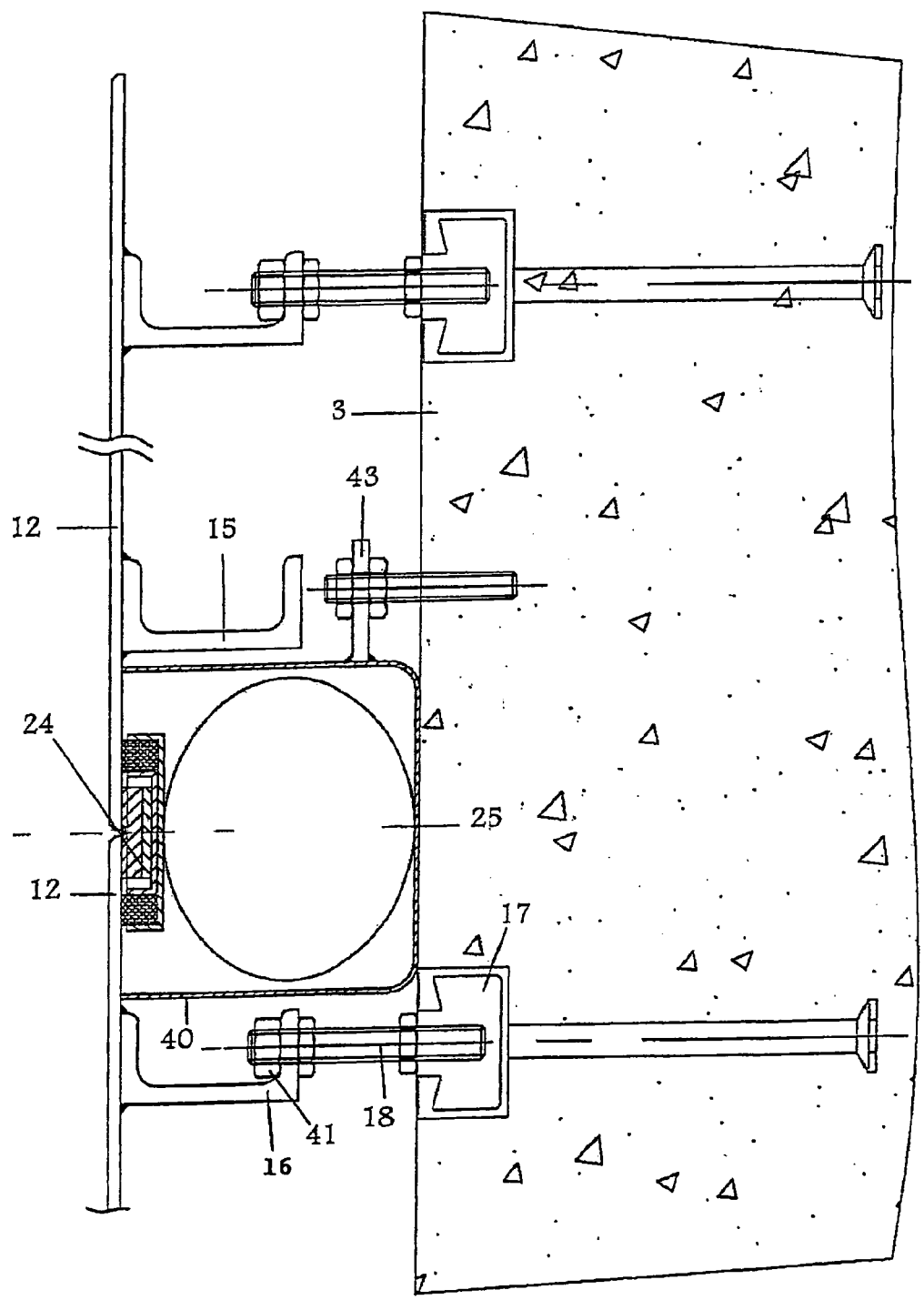
Figure 12:
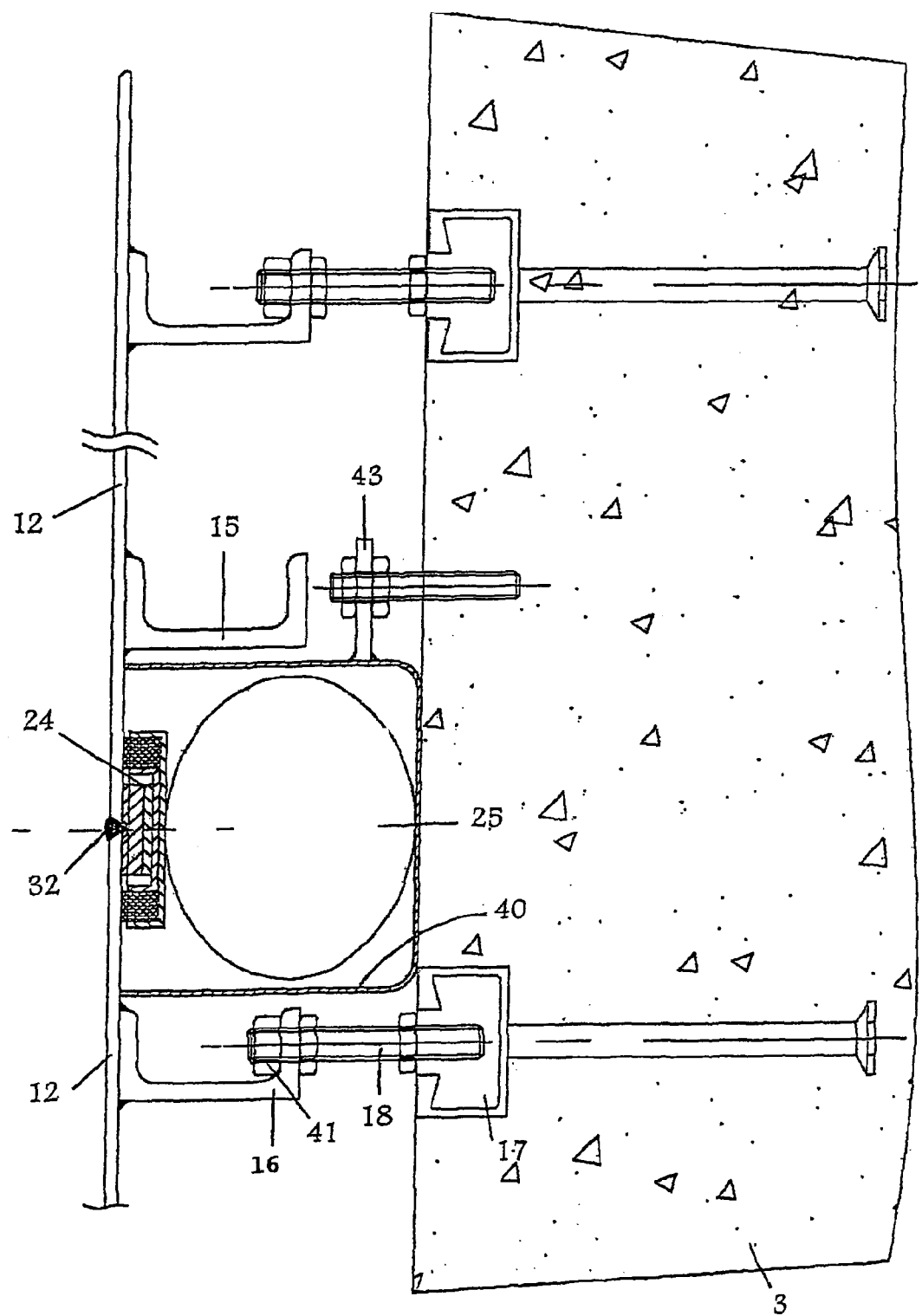

FIG. 11 illustrates fitting of movable saddle 24 secured inside gutter 40 against sheets 12 by means of a support element pressing between concrete wall 3 and saddle 24. The support element is for example formed by a pneumatic jack 25 or an inflatable cushion pressing against concrete wall 3. FIG. 12 shows the welding phase of the two sheets 12.

Figure 13:
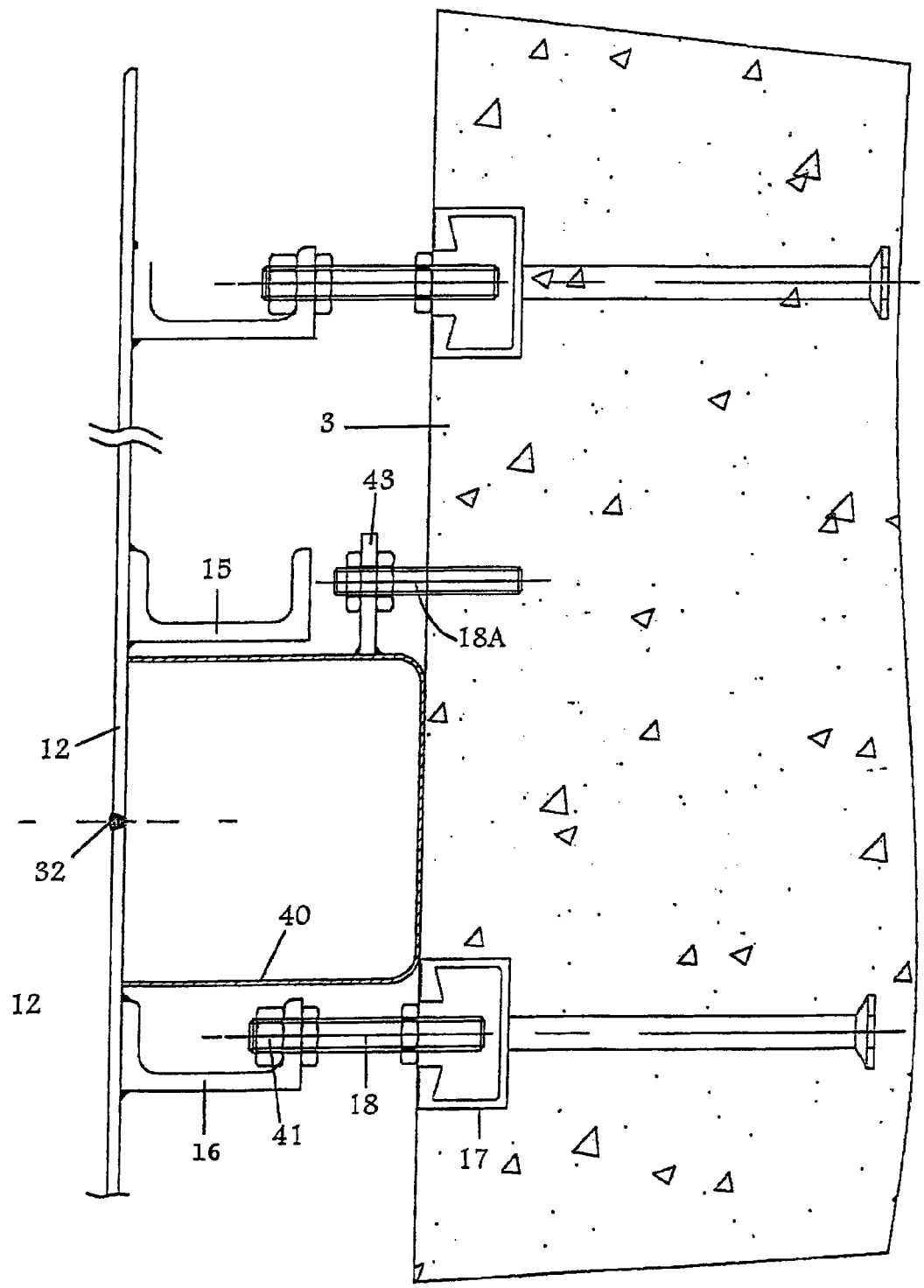

In FIG. 13, saddle 24 and pneumatic jack 25 are removed, and the inspection tests of weld bead 32 are then carried out as described above with reference to FIG. 6. When the test is positive, final pouring of the second phase concrete can take place between first phase concrete 3 and sheets 12.

The presence of drip recovery gutter 40 is an additional safety feature guaranteeing the dependability of tightness of the covering. It can also enable weld bead 32 to be made by means of movable saddle 24. In this case it forms rail 22.

The third embodiment of FIGS. 14 to 23 represents the different phases of producing a covering for a containment pool or tank in a single concreting phase. The same reference numbers will be used in the following to denote identical parts to those of FIGS. 3 to 13.

With a single concreting phase and unlike the previous embodiments, sheets 12 are not fixed to a concrete wall 3 but to one of the two walls 50 and 51, in general made of metal, of a previously installed formwork. The distance separating the two walls 50 and 51 determines the thickness of the part of the covering made.

Figure 14:
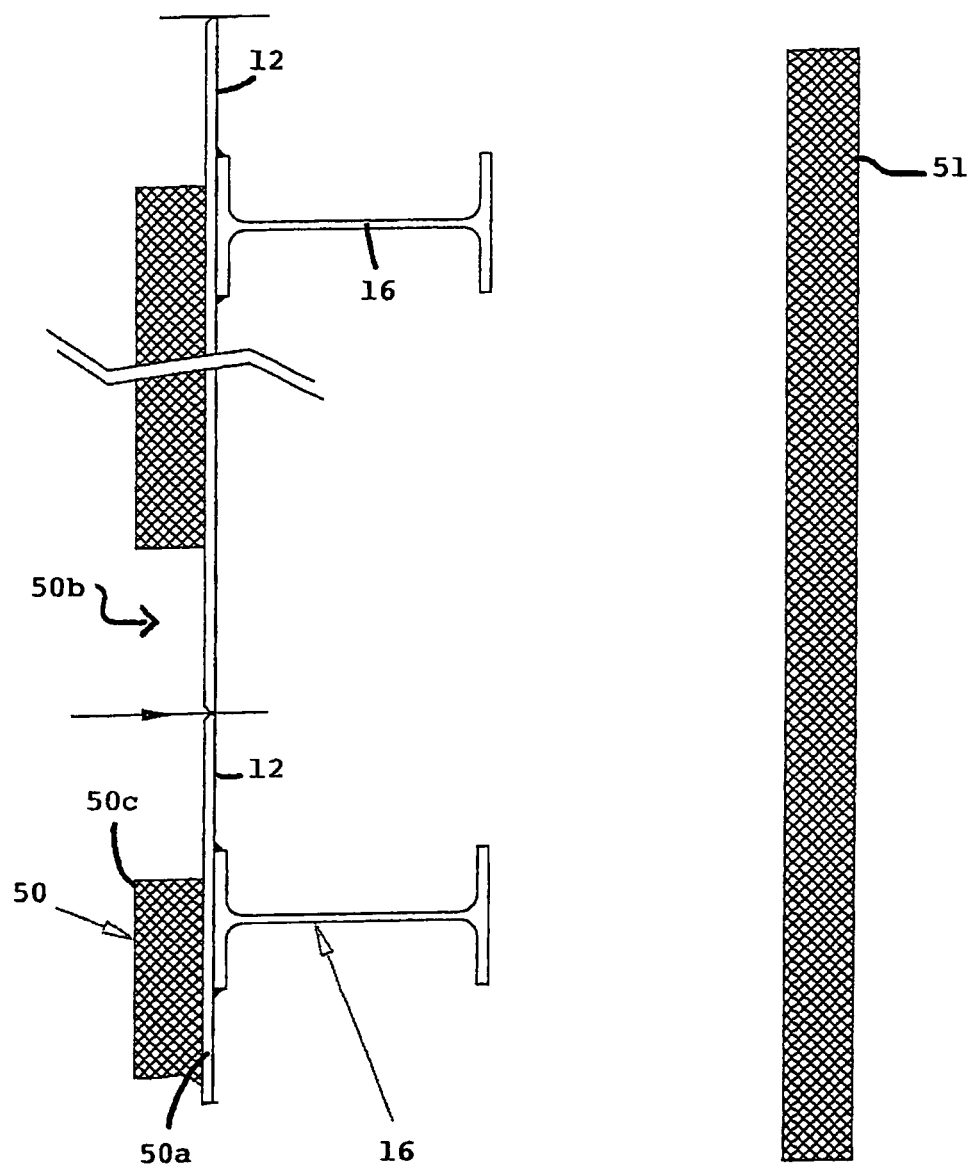
FIGS. 14 to 21 illustrate an alternative embodiment of a covering with welded sheets.

FIG. 14 thus represents two adjacent sheets 12 arranged and fixed onto one of faces 50a of wall 50. Sheets 12 are arranged side by side and their adjacent edges define the area to be welded.

Sheets 12 are further arranged facing the other wall 51 of the formwork. Anchoring elements 16 of sheets 12 are then salient in the direction of said wall 51.

Figure 15:
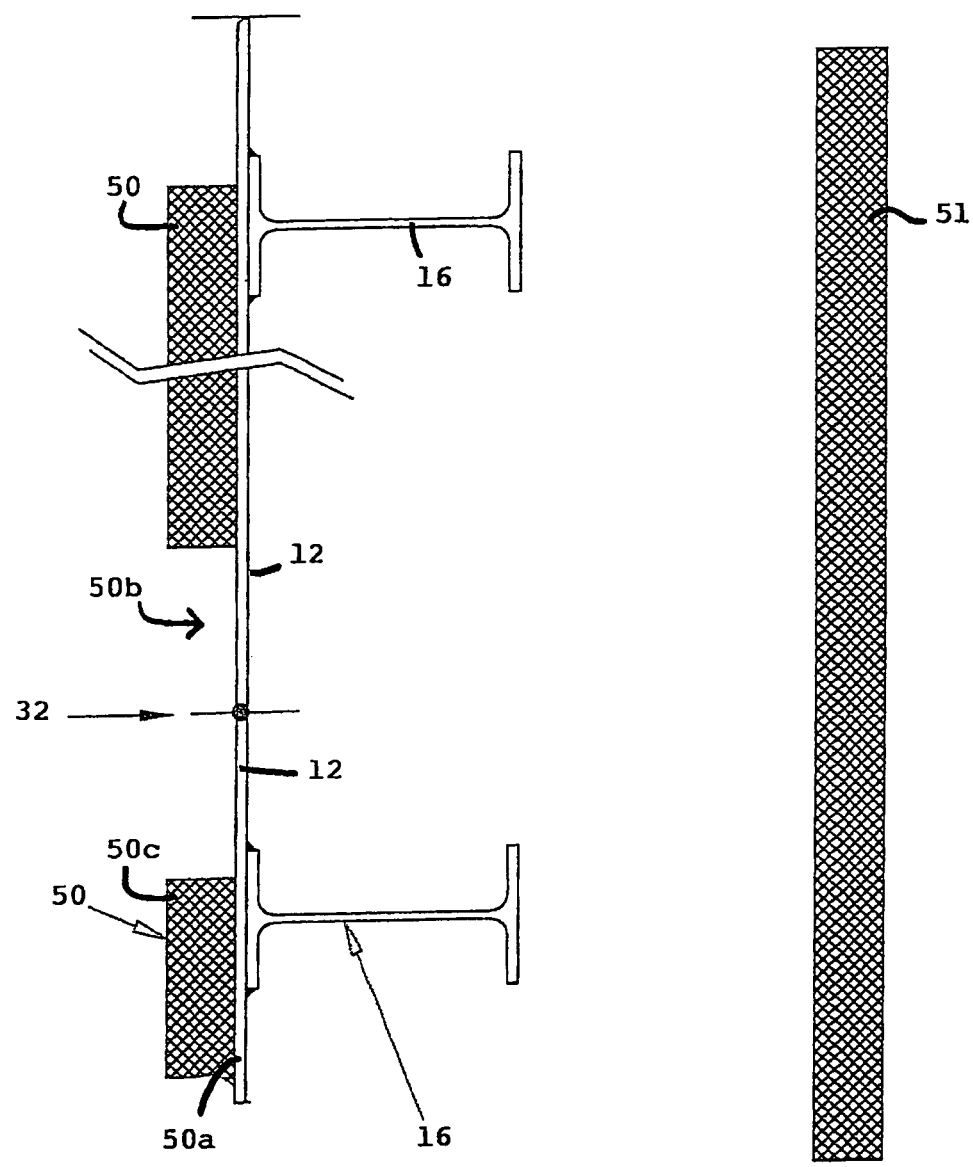

Wall 50 receiving sheets 12 also comprises an opening 50b enabling access to the area to be welded, via face 50c of wall 50, and therefore enabling weld bead 32 to be made, as represented in FIG. 15.

Weld bead 32 is advantageously made via face 50c of wall 50 (i.e. on the left-hand side with respect to wall 50 in FIGS. 14 and 15) whereas sheets 12 are arranged on face 50a of wall 50 (i.e. on the right-hand side with respect to wall 50 in FIGS. 14 and 15). The weld is then inspected.

Figure 16:
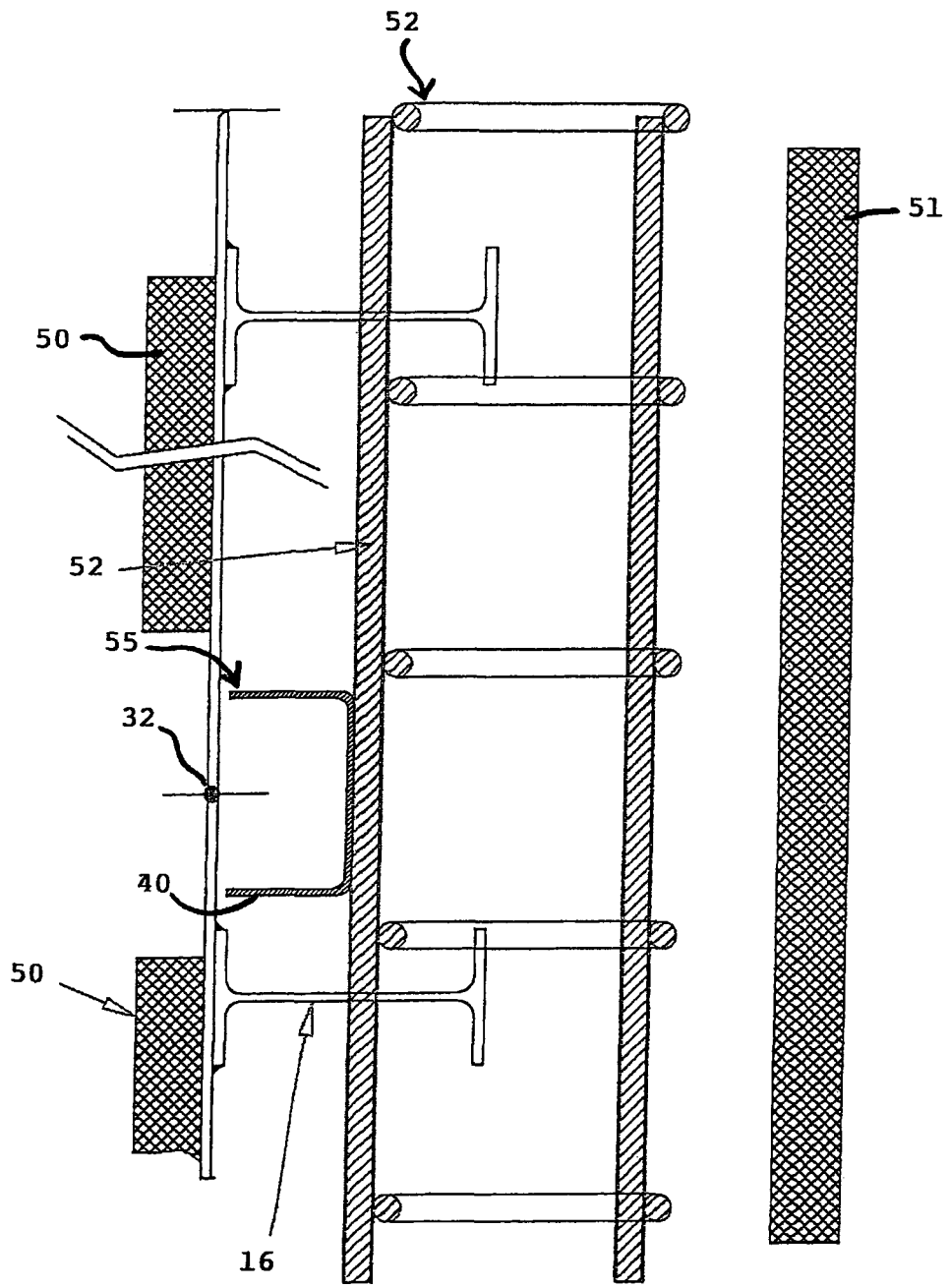
Figure 17:
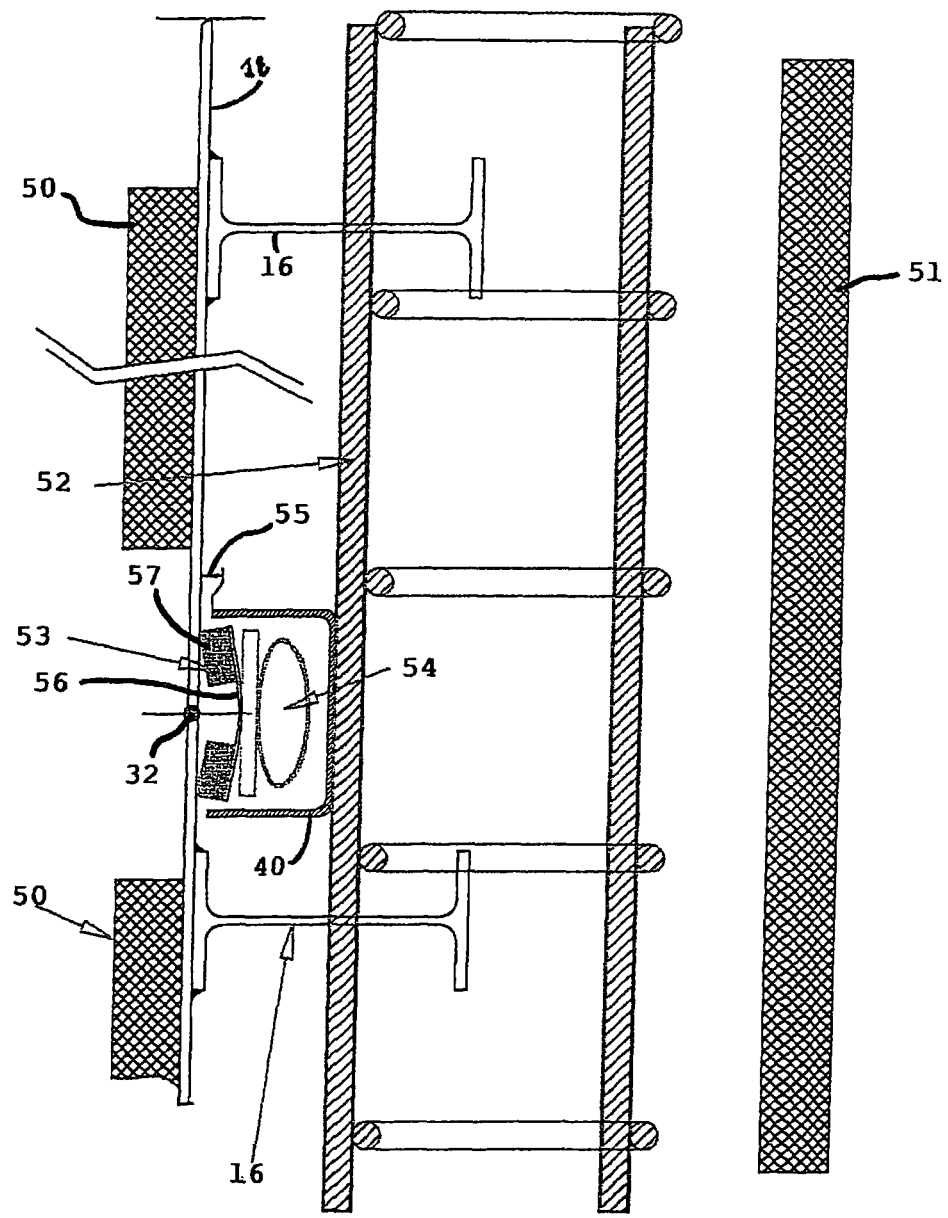

Then, as represented in FIG. 16, a reinforcement 52 is placed between sheets 12 and wall 51 and a drip recovery gutter 40 is fitted between sheets 12 and said reinforcement, opposite weld bead 32. Drip recovery gutter 40 presents a U shape and has parallel branches extending perpendicularly to the two adjacent sheets 12. It thus presses on reinforcement 52. Furthermore, weld bead 32 of sheets 12 is preferably located at equal distance from the parallel branches of gutter 40.

A seal 53 is then fitted in drip recovery gutter 40. By activation of a pressurizing system 54, seal 53 provides the tightness between sheets 12 and gutter 40 and, more particularly, the end of the branches of gutter 40, in particular when there is a clearance 55 between the branches of gutter 40 and sheets 12.

Seal 53 is in particular formed by a flexible blade 56 that is substantially curved in a rest position. The blade is provided with a rubber pad 57 at each of its ends. Seal 53 is thus fitted in drip recovery gutter 40 in its rest position (FIG. 17), each pad 57 being arranged against a sheet 12 on each side of weld bead 32. Weld bead 32 is advantageously at equal distance from pads 57.

Figure 18:
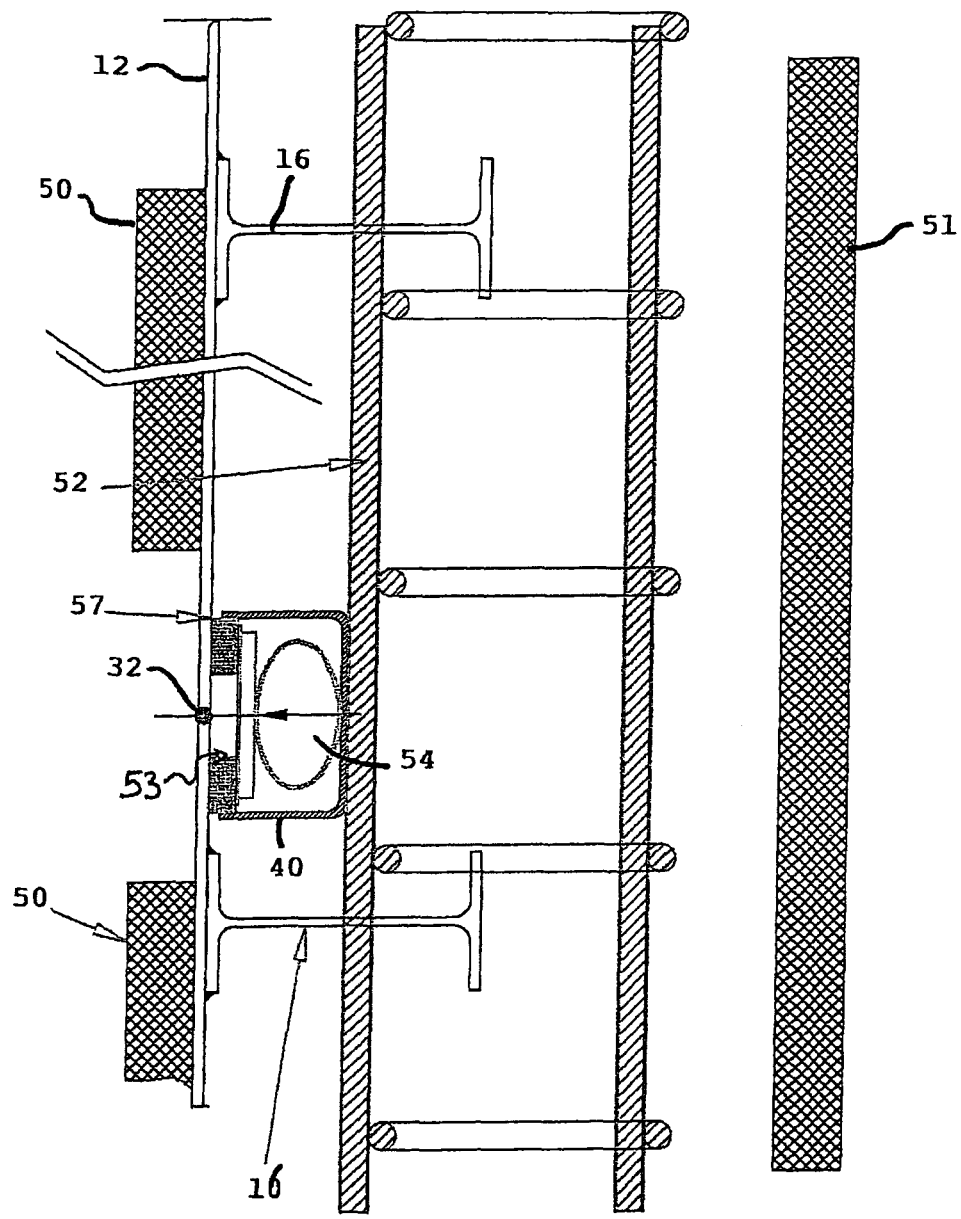
Figure 19:
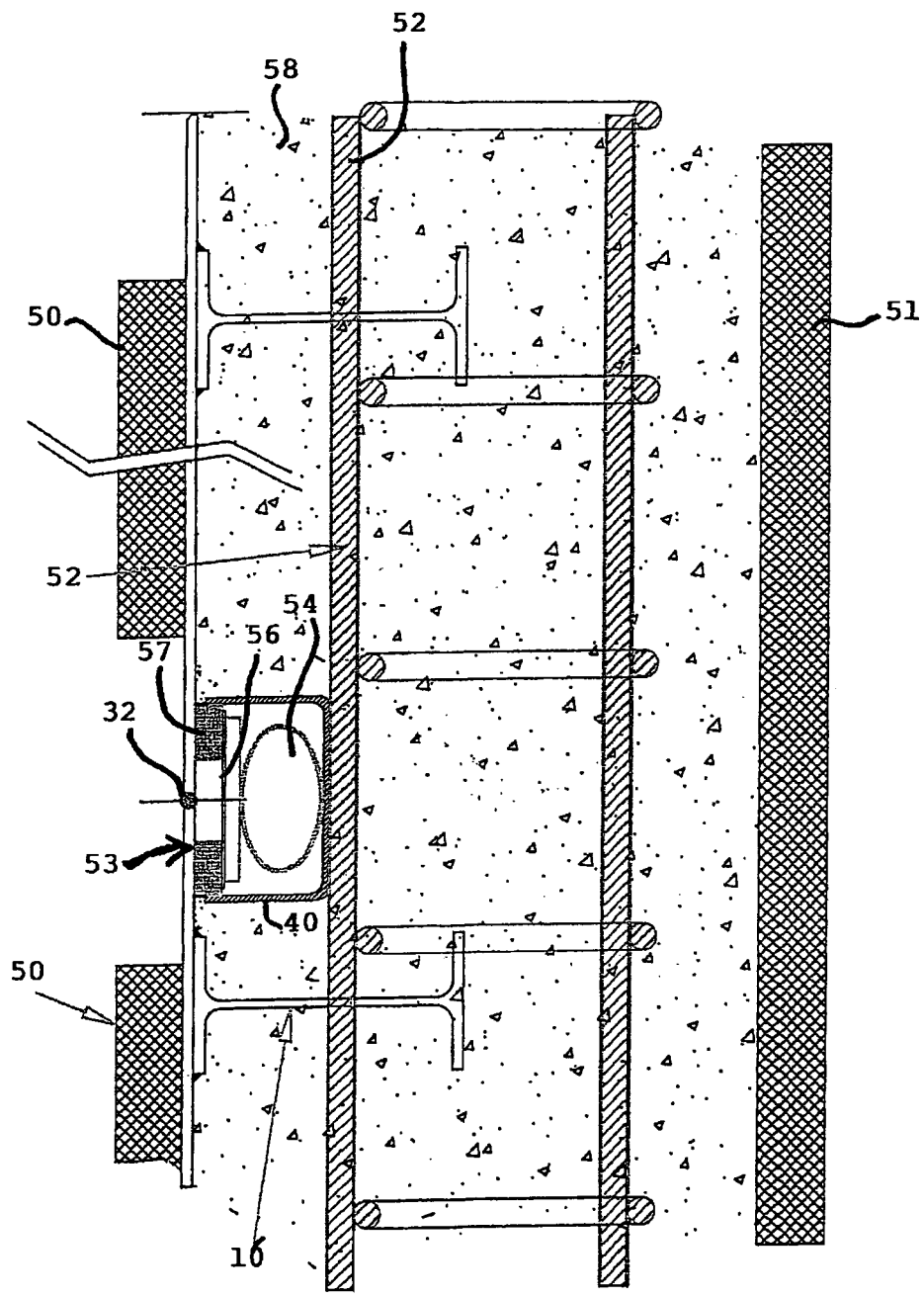

Then, as represented in FIG. 18, when pressurizing system 54 is activated, seal 53 is flattened and pads 57 are pressed against sheets 12 and seal off the free space between sheets 12 and the branches of gutter 40. Pads 57 thereby ensure the tightness between gutter 40 and sheets 12 by taking up the clearance.

The dimensions of blade 56 and pads 57 are more particularly chosen to ensure the tightness between gutter 40 and sheets 12 when the blade is flattened by the pressurizing system. Seal 53 then insulates the inside of gutter 40 when pressurizing system 54 is activated. Pressurizing system 54 is for example a pneumatic jack or an inflatable cushion. When it is activated, the pressurizing system exerts a pressure on the flexible blade, advantageously in the centre thereof. The blade then moves from a curved position (rest position) to a flattened position. This results in movement of pads 57 so that the latter seal off the space between the end of the branches of gutter 40 and sheets 12.

Figure 20:
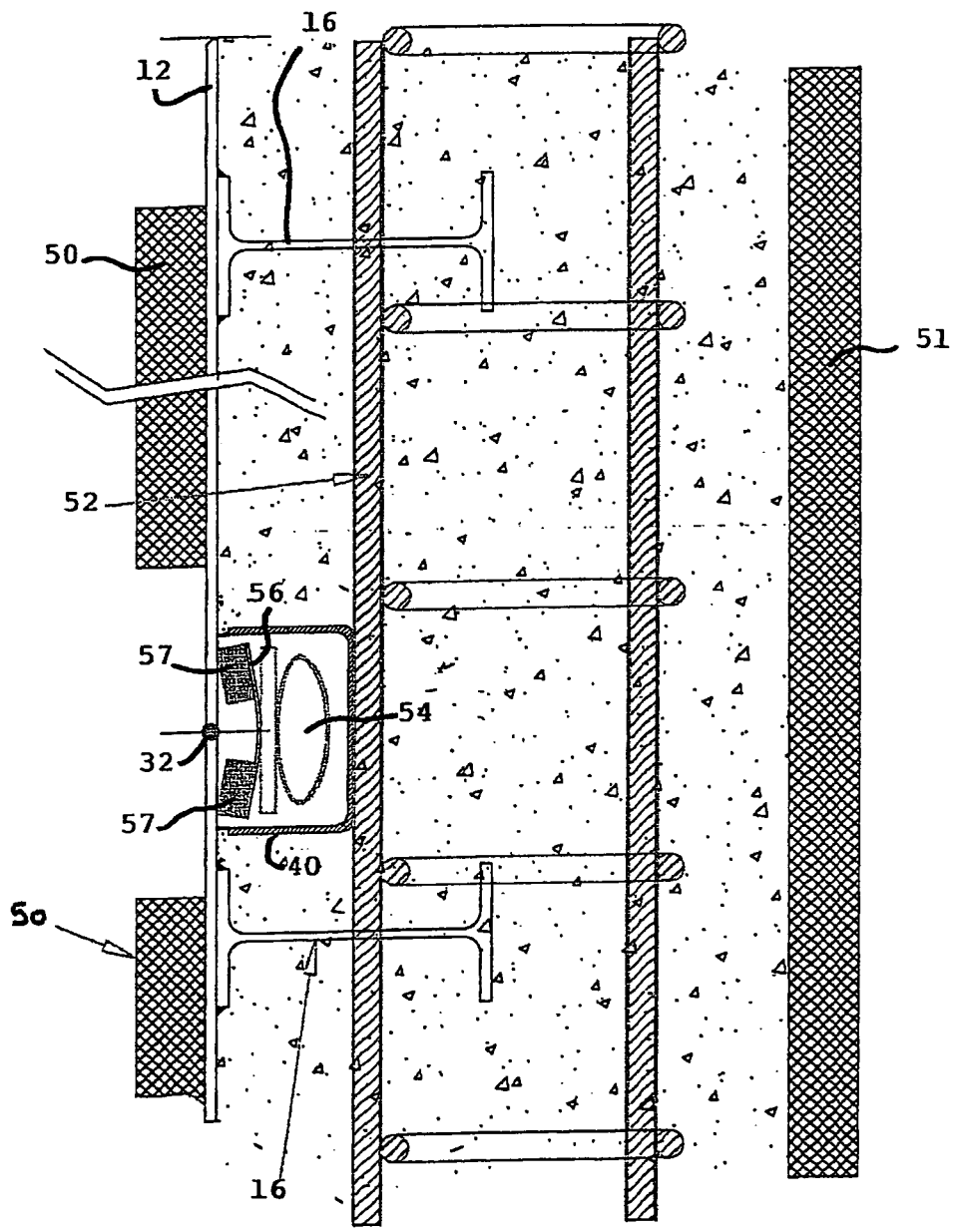
Figure 21:
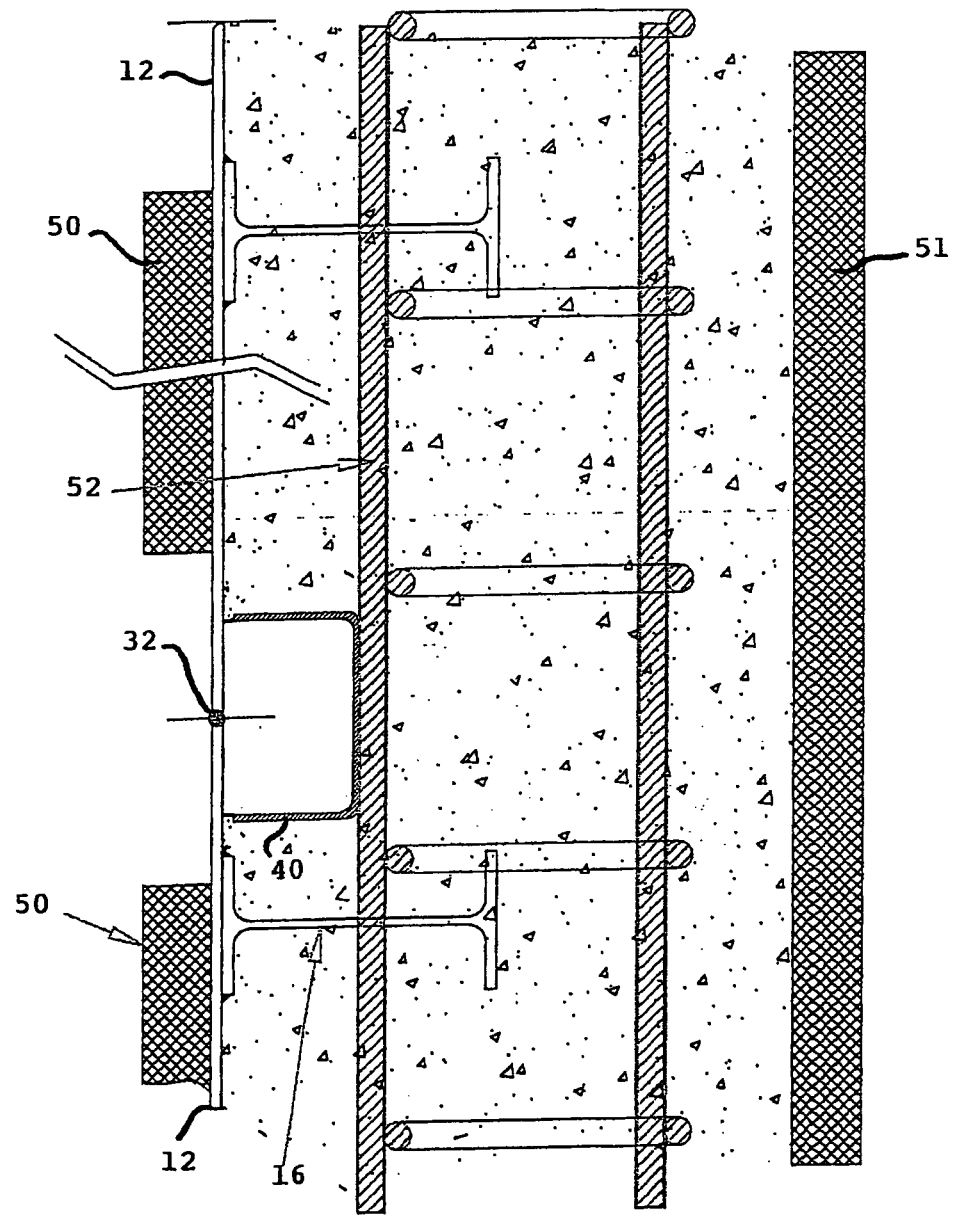

Concrete 58 is then poured between wall 51 and sheets 12 (FIG. 19), embedding reinforcement 52 and anchoring elements 16. The tightness of gutter 40 being on the other hand achieved by seal 53 during pouring of the concrete 58, the latter does not penetrate inside gutter 40. Once concrete 58 has set, pressurizing system 54 is deactivated (FIG. 20). Seal 53 reverts to its rest position before being removed (FIG. 21), thereby leaving a passage for drip recovery and insertion of the welding inspection equipment, as described in the first embodiment.

In FIGS. 14 to 21, weld bead 32 was made before reinforcement 52 and gutter 40 were installed. However, in an alternative embodiment, weld bead 32 can be made after gutter 40 has been installed. More particularly, in this case, weld bead 32 can be made as represented in FIGS. 10 to 13, with a movable saddle 24, like the one represented in FIG. 5 and arranged in said gutter 40. Movable saddle 24 comprises a neutral gas diffusion volume coming into contact with the two adjacent sheets 12 due to the action of a support element resting between gutter 40 and saddle 24. Once the sealing weld between adjacent sheets 12 has been made in a neutral gas atmosphere, the saddle is removed. In this alternative embodiment, drip recovery gutter 40 is arranged facing the area to be welded and not facing weld bead 32, and pads 57 of seal 53 are respectively fitted on each side of the area to be welded before pressurizing system 54 is activated.

Likewise, although achieving tightness between sheets 12 and drip recovery gutter 40 before the concrete is poured has been described in the case of a single concreting phase, it can also be used in the embodiments comprising two concreting phases.

In particular, in the embodiment represented in FIGS. 7 to 13, weld bead 32 is advantageously made after drip recovery gutter 40 has been fitted pressing against first phase concrete wall 3. A seal then ensures the tightness in drip recovery gutter 40 when final pouring of the second phase concrete is performed between first phase concrete wall 3 and sheets 12.

The invention claimed is:

1. A method for making a covering for a containment pool, tank or enclosure comprising an assembly of a series of adjacent sheets, the adjacent sheets being welded to one another to form a part of a surface of the covering by making a weld bead, the method comprising:
   placing the adjacent sheets side by side and parallel to a first wall at a predetermined distance from the first wall, each sheet comprising anchoring elements fixed to a first face of the sheet arranged facing the first wall, in order to fix each sheet to the first wall, and
   placing a rail situated between the anchoring elements of two adjacent sheets between the first wall and the first faces of the adjacent sheets, the rail facing an area to be welded between the two adjacent sheets, and comprising side walls and a back base designed to receive a movable mechanical assembly, wherein welding of the adjacent sheets is performed after the rail has been fitted, the method further comprising:

inserting the mechanical assembly in the rail, said mechanical assembly comprising a neutral gas diffusion volume coming into contact with the first faces of two adjacent sheets due to an action of a support element pressing between the rail and the mechanical assembly, making the weld bead between two adjacent sheets in the neutral gas diffusion volume, and removing the mechanical assembly, wherein welding of the adjacent sheets is a full-penetration butt welding and is followed by pouring concrete between said first wall and the sheets, the anchoring elements of the sheets being completely independent from the weld bead after the concrete has been poured.

2. The method according to claim 1, wherein, each sheet comprises on its first face L-shaped angles each forming the rail facing the area to be welded, with the associated angle of an adjacent sheet when the adjacent sheets are fitted and secured.

3. The method according to claim 1, wherein the rail is a drip recovery gutter.

4. The method according to claim 3, wherein the drip recovery gutter presents a U shape having parallel branches extending perpendicularly to the two adjacent sheets.

5. The method according to claim 4, wherein a seal, providing a tightness between two adjacent sheets and the drip recovery gutter by activation of a pressurizing system, is fitted in the drip recovery gutter, before the concrete is poured, and the pressurizing system is deactivated and the seal is removed before the concrete has set.

6. The method according to claim 5, wherein the seal being formed by a blade substantially curved in a rest position and provided with a rubber pad at each of its ends, said seal is fitted in the drip recovery gutter in its rest position, each pad being arranged against a sheet, on each side of the area to be welded or of the weld bead.

7. The method according to claim 6, wherein, when the pressurizing system is activated, the seal is flattened and the pads provide the tightness between the branches of the drip recovery gutter and the sheets.

8. The method according to claim 1, wherein placing of the sheets comprises fixing the sheets against a second wall forming a formwork with the first wall, the sheets being arranged facing the first wall.

9. The method according to claim 8, wherein the second wall comprises at least one opening enabling the weld bead of the sheets to be made, on the side of the second wall opposite the side receiving the sheets.

10. The method according to claim 8, comprising installation of a reinforcement between the sheets and the first wall, before the drip recovery gutter is fitted, said gutter pressing against the formwork, and welding of the sheets is performed before the formwork is installed.

11. The method according to claim 1, wherein the mechanical assembly comprises a sealed gutter held pressing on said sheets, an inert gas diffuser being arranged in the sealed gutter.

12. The method according to claim 1, wherein welding is performed by a welding method chosen from TIG welding, MIG welding, plasma welding, laser welding and electron beam welding.

13. The method according to claim 1, wherein concrete pouring is preceded by an inspection step of the weld bead comprising a penetrant inspection test, an X-ray inspection test and at least one visual inspection test.

* * * * *